United States Patent
Kato et al.

(10) Patent No.: US 6,915,346 B1
(45) Date of Patent: Jul. 5, 2005

(54) APPARATUS AND SYSTEM FOR DISPLAYING RECEIPT OF A PACKET

(75) Inventors: Naotaka Kato, Fujisawa (JP); Takashi Yanagisawa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/368,259

(22) Filed: Aug. 3, 1999

(30) Foreign Application Priority Data

Sep. 8, 1998 (JP) .......................................... 10-253168

(51) Int. Cl.$^7$ ............................................... G06F 15/16
(52) U.S. Cl. ..................... 709/227; 709/208; 709/212; 709/213; 709/217; 709/220
(58) Field of Search ................ 709/208–229, 709/230–244; 715/500.1–513

(56) References Cited

U.S. PATENT DOCUMENTS

| | | | | |
|---|---|---|---|---|
| 4,783,654 A | * | 11/1988 | Ichikawa ....................... | 340/7 |
| 5,526,493 A | * | 6/1996 | Shu ............................. | 395/281 |
| 6,049,885 A | * | 4/2000 | Gibson et al. ............... | 713/324 |
| 6,052,779 A | * | 4/2000 | Jackson et al. ................ | 713/2 |
| 6,101,608 A | * | 8/2000 | Schmidt et al. ............. | 713/202 |
| 6,122,530 A | * | 9/2000 | Overy et al. ................. | 455/566 |
| 6,158,020 A | * | 12/2000 | Locker et al. ............... | 709/224 |
| 6,289,449 B1 | * | 9/2001 | Aguilar et al. ................ | 713/1 |
| 6,311,276 B1 | * | 10/2001 | Connery et al. ............ | 713/201 |
| 6,321,340 B1 | * | 11/2001 | Shin et al. ................... | 713/310 |

FOREIGN PATENT DOCUMENTS

EP          502744 A2 *  9/1992

\* cited by examiner

*Primary Examiner*—Dung C. Dinh
*Assistant Examiner*—Isaac M. Woo
(74) *Attorney, Agent, or Firm*—George E. Grosser; Charlie Bustamante; Dillon & Yudell LLP (57) ABSTRACT

A connection unit for a computer, which is connectable to a network, is configured such that in response to a receipt by the connection unit of a predetermined wake-up packet via the network, a predetermined signal is generated. Following which, in response to the predetermined signal, the receipt of the predetermined wake-up packet is persistently displayed utilizing a dedicated display. With these means, a user of the computer is enabled to recognize the fact execution of WOL has been carried out or attempted, without running a specific application (adapted for informing the user of the fact that WOL was executed) on the computer, or even where the computer is not connected to the connection unit.

9 Claims, 9 Drawing Sheets

APPARATUS AND SYSTEM FOR DISPLAYING RECEIPT OF A PACKET

BACKGROUND OF THE INVENTION

1. Technical Field

This invention relates to a connection unit such as an expansion unit for expanding functions of an information processing system such as a personal computer mounted thereon and, more particularly, to an expansion unit for offering a LAN connection environment to an information processing system mounted thereon. More specifically, this invention relates to an expansion unit for offering a WOL (Wake-up On LAN) history displaying function to an information processing system.

2. Description of the Prior Art

Recently, the term "network computing" frequently appears in a variety of media such as newspapers, periodicals and the like. "Network computing" literally means an environment, wherein a plurality of computers and/or peripheral devices are coupled together by a communication medium (whether it be a wired or wireless medium). Also, "network" means a communication network for transmitting data among computers. There are diverse forms of networks, which range from a local area type such as a LAN (Local Area Network) to a wide area type such as a public switched telephone network (PSTN), and further to the "Internet" that has grown into an enormous collection of global networks as a result of interconnecting respective servers. A computer system as a DTE (Data Terminal Equipment) is connected to a network via a DCE (Data Circuit-Terminating Equipment). A DCE is either one of a modem (Modulator/Demodulator), a TA (Terminal Adapter) and a LAN adapter (e.g., Ethernet card or token ring card) depending on whether the network involved is an analog type such as PSTN, ISDN (Integrated Services Digital Network) or a LAN. Also, a DTE may be a general purpose computer system (e.g., an IBM PC/AT compatible machine ("PC/AT" is a trademark of International Business Machines Corporation), besides any dedicated terminal connected to the network via a DCE.

A LAN is a smallest unit of a network, which is autonomously operated/managed by an independent organization such as a college or a research institution to cover a relatively narrow area such as a single campus or the like. Supported with the price reduction of communication equipment reflecting the evolution of semiconductor technologies and the enhanced functions of communication software, LANs have been primarily and deeply used in research/development arenas for the purpose of sharing computer resources, sharing/distribution of information and the like.

The forms of LANs are generally categorized as a peer-to-peer type and a client/server type. In the peer-to-peer LAN, interconnected DTEs have no master/slave relationship among them so that they are treated equally. More particularly, in the peer-to-peer LAN, there exists such relationship among the interconnected DTEs that allows each of them to share a resource of another DTE respectively, whereby a disk and/or a printer owned by a user of a given DTE may be used by another LAN user as it is. On the other hand, in the client/server LAN, a single machine on the LAN is dedicated to be a server, which is to be shared by other LAN users (i.e., clients). In the client/server LAN, the server for offering service and clients for accepting service are synchronized each other by using a remote procedure call (RPC) to continue respective processing.

Today, the client/server LAN that has general purpose personal computers (PCs) interconnected is becoming the mainstream of network computing. This is primarily intended for enjoying the advantages of this scheme as described below.

(1) Installing software that is necessary for each client PC, each user is allowed to freely perform his own work. (2) Data/files to be shared are placed on a server's side. Also, a printer is connected to the server such that each user can share it via the network. (3) Installing software such as groupware onto the server, it is possible to perform processing corresponding to a group work.

However, as a result of excessively distributing information toward a client's side (i.e., client PC is overgrown), it has been found problematic in that maintenance and/or management of the client system requires a vast amount of costs. For example, whenever an OS or an application is to be upgraded, there has been no way to avoid cumbersome manual works such as installation and/or setup for each PC. It is, therefore, mandatory to reduce costs of an entire network, i.e., total cost of ownership (TCO).

One of the known concepts for reducing TCO is to use a server for centrally managing software resources on a network. For example, by simply updating a program on the server, those programs available at clients' sides are automatically updated. By centrally managing from the server's side in this way, it becomes possible to prevent any trouble due to an operational miss on a client's side from occurring, which will in turn lead to reduction of TCO.

As one of the techniques for reducing TCO, it is possible to apply WOL ("Wake-up ON LAN") in such a way that a system configuration of a client's side can be managed via the network. By automatically activating each client system, which has been powered off, via the network during a convenient time zone such as at night where the office changes to an unattended environment, it becomes possible to install a new application onto each system or to replace an older one with a new one.

In order to implement WOL, it is essential that a DCE to be connected to a network or a LAN is provided with the WOL function. When a DTE as a user terminal is a general purpose computer system, a DCE is provided in the form of a LAN adapter card, for example. The adapter card is insertable into a "bus slot", which is generally formed on a computer's system unit (at its mother board).

Figure 6:
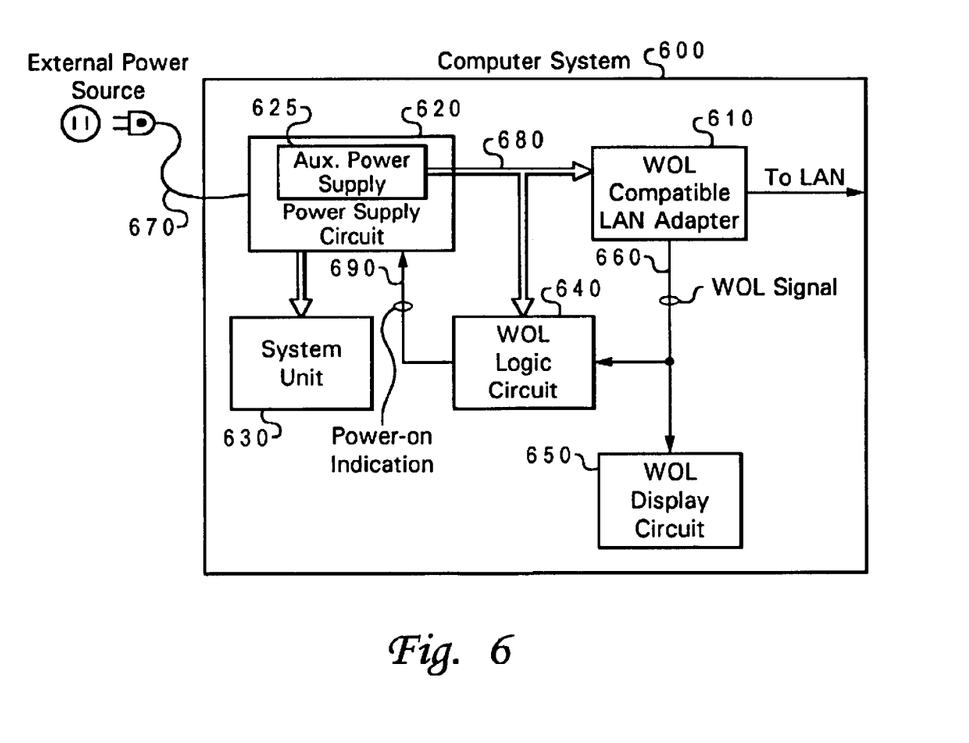
FIG. 6 is a diagram schematically showing a configuration of a WOL compatible computer system.

The WOL function is implemented by a function for automatically starting up a computer system via a network or a LAN. In FIG. 6, there is schematically shown a configuration of a WOL compatible computer system. A WOL compatible LAN adapter 610 is connected to a LAN and, upon recognition of a frame packet (hereafter called "wake-up packet") for indicating activation (i.e., "Wake-up") of the system that is currently in a stopped state, asserts a WOL signal 660 to the system's side. Also, the WOL compatible computer system is provided with an auxiliary power supply 625, which continually feeds power to the LAN adapter 610 such that a WOL operation is enabled while the system itself is in a power-off state. Further, the computer system is provided with a WOL logic circuit 640, which is responsive to detection of the WOL signal asserted by the WOL compatible LAN adapter 610 for issuing a power-on indication to a power supply circuit 620 for the entire system.

Figure 7:
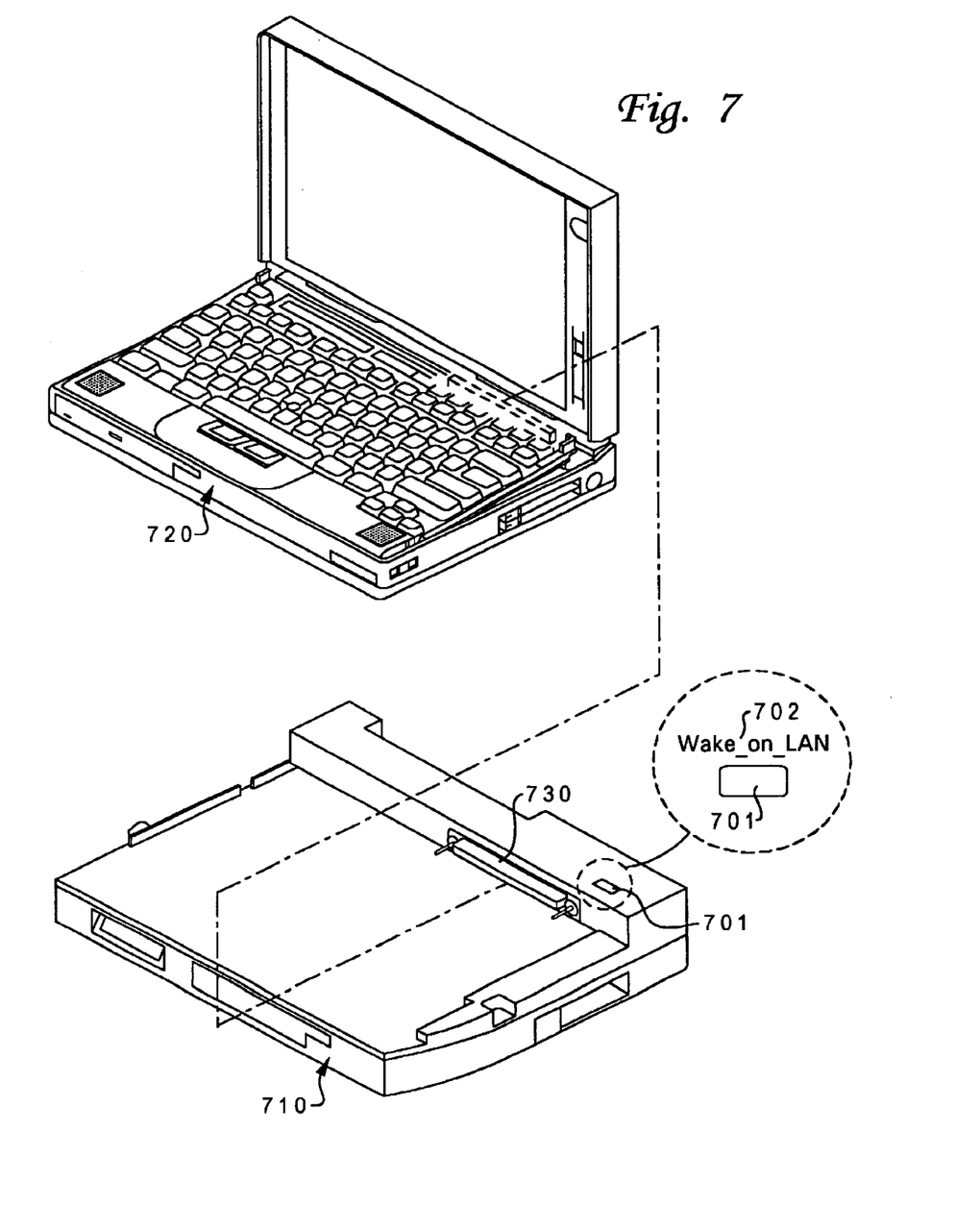
FIG. 7 is a schematic diagram showing a computer and an expansion unit adapted for practicing this invention.

The term "expansion unit" means herein such equipment that is used for expanding a peripheral environment of a notebook PC by simply mounting the PC thereon. In FIG. 7, there is shown a manner of mounting a notebook PC 720 onto an expansion unit 710. For ensuring portability, the notebook PC 720 is designed and manufactured to have a smaller size and a lighter weight at the sacrifice of its peripheral environment. For example, the notebook PC 720 is capable of accommodating a limited number of external storage devices alone, and only PC cards may be inserted therein since it has no bus slot for mounting an adapter card thereon. Note in this respect that it is extremely cumbersome for a user, who carries the notebook PC 720, to attach/detach connection cables for a variety of equipment used in an office environment such as a printer, a CRT (Cathode Ray Tube) display, an external keyboard and the like. The expansion unit 710 is such equipment that offers the same working environment as a desktop PC whenever the notebook PC 720 is used in an office. For this purpose, the expansion unit 710 has a "Port Replication function" and a "Bus Expansion function".

The port replication function is implemented by having extensions of connection port signals in the notebook PC 720's system unit. If, at the expansion unit 710's side, peripheral devices (not shown) such as a printer, a CRT display and an external keyboard are previously cable connected, a user will be allowed to immediately make use of these peripheral devices by simply mounting the notebook PC 720 onto the expansion unit 710. Also, if these peripheral devices are kept connected to the expansion unit 710, these peripheral devices will be immediately available to another notebook PC 720 mounted on the expansion unit 710 without worrying about the cumbersome works to attach/detach cables. Such a function for centrally managing cable connections may be called a "cable management function".

On the other hand, the "bus expansion function" is implemented by having at the expansion unit 710's side extensions of buses in the notebook PC 720's system unit (e.g., a PCI (Peripheral Component Interconnect) bus as a local bus and an ISA (Industry Standard Architecture) bus as a system bus). The expansion unit 710 has a space for accommodating one or more external storage devices to be connected to a bus, along with one or more bus slots for mounting one or more adapter cards thereon. Attaching a HDD, a SCSI (Small Computer System Interface) adapter card and a LAN adapter card onto the expansion unit 710, it is possible to offer a file subsystem or a network subsystem to a user of the notebook PC 720. Incidentally, the expansion unit 710 may be called a "docking station". Also, an expansion unit having the port replication function alone may be called a "port replicator".

Generally, the expansion unit 710 is used in a "single user mode" or a "multi user mode". The former means that a single PC user exclusively owns the expansion unit 710, i.e., only a particular notebook PC is exclusively mounted on a single expansion unit 710. On the other hand, the multi user mode means that a plurality of PC users share a single expansion unit 710, i.e., a notebook PC of each user may be interchangeably mounted on the expansion unit 710. In the multi user mode, it may frequently happen that policies and/or strategies differ from user to user.

Incidentally, an expansion unit per se is disclosed, for example, in JA patent application 5-181593 (JA patent publication 7-36577) and JA patent application 6-134124 (JA patent publication 8-6668), each being assigned to the present applicant.

Now, with reference to FIG. 4, operations of a prior system will be described. (1) In a first case where a note PC 409 is connected to a docking station 407: A system administrator sends a WOL packet to a note PC system 410 for activating the system. While, at this point of time, a power supply for the notebook PC 409 of the note PC system 410 is in an off state, its LAN feature section is continually driven by an auxiliary power supply to wait for arrival of a WOL packet. Whenever a WOL packet sent from a server 403 via a network 401 arrives at the notebook PC system 410, a signal (PME# or the like) for activating the system is asserted to start up the power supply for the note PC 409, thereby activating the system. After the system is activated, the system administrator performs maintenance or the like of the note PC 409 using remote control software or the like and, subsequent to termination thereof, shuts down the system to complete a sequence of operations.

(2) In a second case where a note PC 409 is not connected to a docking station 405: The system administrator sends a WOL packet to the docking station 405 for activating the system. Since, at this point of time, the note PC 409 is not connected to the docking station 405, an auxiliary power supply for a LAN feature section within the docking station 405 is in an off state. Accordingly, even if a WOL packet is received, no event will occur at all. Because the note PC 409 is not activated despite sending of the WOL packet, the system administrator will resend the WOL packet. However, the same result will be iterated and, thus, operations will be terminated without completing the intended maintenance or the like.

In many occasions, such WOL operations are executed at night where the office changes to an unattended environment, thereby to prevent routine jobs from being obstructed. In the first case (1) above (where a computer is connected), if it is arranged to activate an application after starting up the system on the next morning to inform the execution of WOL, a user of the PC system 409 to be managed will be able to recognize that its maintenance or the like has been performed by the system administrator. However, with this approach, there is no way to know, before activating the system, whether or not any work such as maintenance has been carried out, nor are all applications designed to inform a user of the fact that such maintenance work has been performed.

Also, in the second case (2) above (where a computer is not connected), while the system administrator has required to manage the PC system 409, nevertheless there is no way for a user of the PC system 409 to know such a situation. On the other hand, in either case (1) or (2) above, there is no way for a user of the PC system 409 to know any history that a malicious third party has either remotely activated or has attempted to remotely activate the system, which may lead to a security problem.

SUMMARY OF THE INVENTION

It is, therefore, an object of this invention to provide an information processing system for displaying a history of WOL operations to an information processing system that is provided with the WOL function.

It is another object of this invention to provide an information processing system that is capable of displaying whether or not the current system activation is caused by WOL.

This invention is concerned with a connection unit for a computer, said connection unit being connectable to a network comprising: (a) means, responsive to receipt of a predetermined packet via the network, for generating a predetermined signal; and (b) means, responsive to the predetermined signal, for displaying the receipt of the predetermined packet, whereby a user of said computer is enabled to recognize the fact that execution of WOL has been carried out or attempted, without running an application on said computer (adapted for informing the user of the fact that WOL was executed), or even where the computer is not connected to the connection unit.

The expansion unit for an information processing system of this invention is provided with a network adapter (e.g., LAN adapter) for connecting to a network. This network adapter has the automatic startup function (so-called WOL (Wake-up ON LAN)). That is, the network adapter is continually fed power from a power supply circuit (e.g., auxiliary power supply) even when the expansion unit (and an information processing system mounted thereon) are powered off, whereby it generates a wake signal (WOL signal) in response to receipt of a wake-up packet via the network, and displays the receipt of the wake-up packet in a manner recognizable by a user.

BRIEF DESCRIPTION OF THE DRAWINGS

For a more complete understanding of the present invention, reference is now made to the following descriptions taken in conjunction with the accompanying drawings, in which.

DETAILED DESCRIPTION

Now, with reference to the drawings, an embodiment of this invention will be described in detail.

A. Hardware Configuration of Computer System

Figure 1:
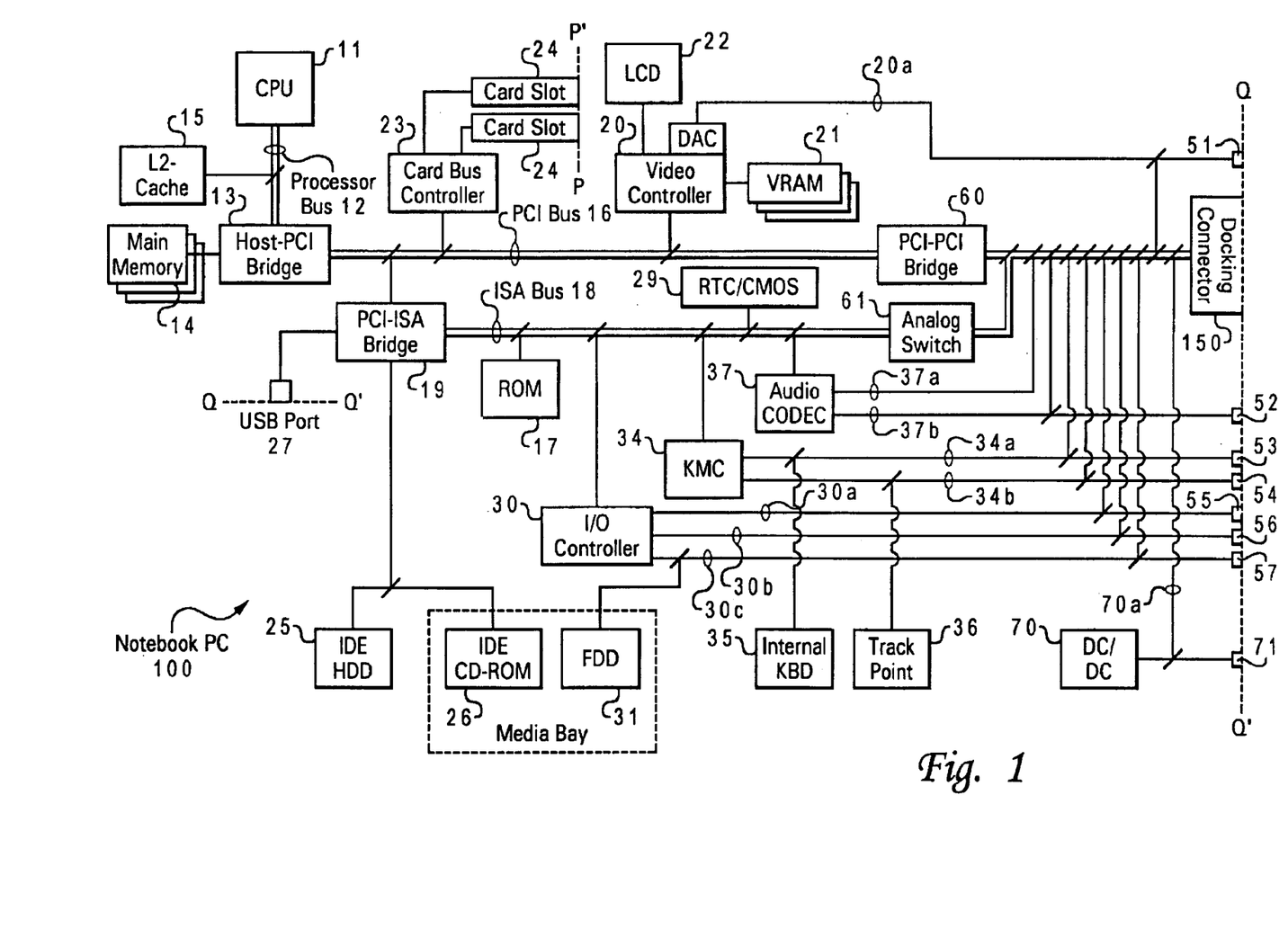
FIG. 1 is a block diagram schematically showing a hardware configuration of a typical personal computer (PC) adapted for implementing this invention.

In FIG. 1, there is schematically shown a hardware configuration of a typical personal computer (PC) 100. An example for implementing this invention is a notebook PC, which conforms to the specifications of OADG (PC Open Architecture Developer's Group) and incorporates an operating system (OS) such as "Windows95, 98" of Microsoft Corp. or "OS/2" of IBM Corp. This notebook PC 100 is provided with a docking connector 150 on a rear side of its system unit, for example, for use in electrically connecting to an expansion unit 200 (to be described below) as a connection unit. Hereinafter, each component will be described.

CPU 11 acting as a main controller executes a variety of programs under the control of OS. CPU 11 may be a CPU chip called "Pentium", "MMX Technology Pentium", "Pentium II", or "Pentium Pro" made by Intel Corp., or alternatively it may be another company's compatible CPU.

CPU 11 interconnects with each hardware component (to be described below) through a hierarchical bus structure of three levels, which comprises a processor bus 12 directly coupled to its own external pins, a PCI (Peripheral Component Interconnect) bus 16 as a local bus and an ISA (Industry Standard Architecture) bus 18 as a system bus.

Processor bus 12 and PCI bus 16 are interconnected by a bridge circuit (host-PCI bridge) 13. The bridge circuit 13 of the present embodiment comprises a memory controller for controlling access operations to a main memory 14, a data buffer for absorbing a speed difference between both buses 12 and 16.

The main memory 14 is a writable memory used as read-in areas of executed programs of CPU 11 or working areas for writing processed data of the executed programs. In general, the main memory 14 comprises a plurality of DRAM (dynamic RAM) chips such that its basic capacity is typically 32 MB and extendable up to 256 MB. The executed programs include an OS such as "Windows98", a variety of device drivers for manipulating peripheral devices under hardware control, application programs adapted for use in specific jobs and firmware stored in a ROM 17 (to be described below).

L2 (Level 2)-cache 15 is a high speed memory for absorbing CPU 11's access time to the main memory 14 and is used for temporarily storing limited code and data to be frequently accessed by CPU 11. In general, L2-cache 15 comprises SRAM (static RAM) chips and its typical capacity is 512 KB.

PCI bus 16 is a type of bus that enables to transfer data at a relatively high rate (bus width: 32/64 bits, maximum operating frequency: 33/66 MHz, maximum data transfer rate: 132/264 MBps), and is used for connecting relatively fast PCI devices such as a video controller 20 and a card bus controller 23. As well known in the art, the PCI architecture is based on the proposal of Intel Corp. and implements the so-called "PnP" (Plug and Play) function.

The video controller 20 is a dedicated controller for actually processing drawing instructions from CPU 11. In operation, it temporarily stores the processed drawing information into a video memory (VRAM) 21, reads the drawing information from VRAM 21 and provides the same as a video output to a liquid crystal display (LCD) 22. Also, the video controller 20 is capable of converting a video signal to an analog form using its associated digital-analog converter (DAC). The analog video signal so converted is output to a CRT port 51 via a signal line 20a. Also, the signal line 20a is branched halfway toward the docking connector 150.

The card bus controller 23 is a dedicated controller for directly coupling those bus signals on PCI bus 16 to an interface connector (card bus) of a PC card slot 24. This PC card slot 24 may be provided at a wall surface P–P' of the computer 100's system unit for accepting a PC card (not shown), which conforms to the industry standard (e.g., "PC Card Standard 951") defined by PCMCIA (Personal Computer Memory Card International Association)/JEIDA (Japan Electronic Industry Development Association).

At a substantial end of PCI bus 16, there is provided a bridge circuit (PCI-PCI bridge) 60. This bridge circuit 60 is interconnecting a secondary PCI bus at the downstream of PCI bus (primary PCI bus) 16. The secondary PCI bus is provided internally to the expansion unit 200 that is connected via the docking connector 150. Incidentally, if any PCI bus is not connected at the downstream, the bridge circuit 60 is arranged to disable each PCI bus signal at its substantial end respectively.

Also, PCI bus 16 and ISA bus 18 are interconnected by a bridge circuit (PCI-ISA bridge) 19. This bridge circuit 19 of the present embodiment is constructed to contain a DMA controller, a programmable interrupt controller (PIC) and a programmable interval timer (PIT). DMA controller is a dedicated controller for executing a data transfer between a peripheral device (e.g., FDD) and the main memory 14 without an intervention of CPU 11. PIC is a dedicated controller that is responsive to an interruption request (IRQ) from a peripheral device for causing a predetermined program (interrupt handler) to be executed. PIT is an apparatus for generating timer signals at predetermined frequencies that are programmable.

Also, the bridge circuit 19 of the present embodiment is provided with an IDE interface for connecting external storage devices, which conform to the IDE (Integrated Drive Electronics). To this IDE interface, an IDE hard disk drive (HDD) 25 and an IDE CD-ROM drive 26 may be connected through ATAPI (AT Attachment Packet Interface). In place of IDE CD-ROM drive 26, another type of IDE device such as a DVD (Digital video Disc or Digital Versatile Disc) drive may be connected. An external storage device such as HDD 25 and/or CD-ROM drive 26 is accommodated in the so-called "media bay" or "device bay" within the computer 100's system unit. These standard external storage devices may be mounted interchangeably with another equipment such as an FDD and/or a battery pack, or they may be mounted exclusively of such equipment.

Further, the bridge circuit 19 of the present embodiment contains therein a USB (Universal Serial Bus) route controller for connecting a USB as a general purpose bus, and has a USB port. This USB port 27 is provided, for example, at the wall surface Q–Q' of the computer 100's system unit. USB supports the "hot plug function" that allows a new peripheral device (USB device) to be attached/detached without shutting down its power, as well as the "Plug and Play function" that allows a newly connected peripheral device to be automatically recognized and a system configuration to be set up again accordingly. To a single USB port, up to 63 USB devices can be connected in a daisy-chain manner. Exemplary USB devices include, but not limited to, a keyboard, a mouse, a joystick, a scanner, a printer, a modem, a display monitor and a tablet.

ISA bus 18 has a slower data transfer rate than PCI bus 16 (bus width: 16 bits, maximum data transfer rate: 4 Mbps) and, thus, it is used for connecting relatively slower peripheral devices such as ROM 17, a real time clock (RTC) 29, an I/O controller 30, a keyboard/mouse controller (KMC) 34 and an audio CODEC 37.

ROM 17 is a nonvolatile memory, which permanently stores code groups (BIOS: Basic Input/Output System) for controlling I/O operations of respective hardware components such as a floppy disk drive (FDD) 31, in addition to firmware such as a POST (Power On Self Test) program to be executed at a power-on time.

RTC 29 is a device for measuring the current time-of-day. In general, RTC 29 is mounted on a single chip with a CMOS memory (not shown). Typically, this CMOS memory is used for temporarily storing critical information to security/safety of the system 100 such as system configuration information (setup values of BIOS) and a power-on password. RTC/CMOS 29 is backed up by a reserve battery (normally a coin battery, not shown) so that the measured/stored contents are not lost even after the system 100 goes to its power-off state. In the present embodiment, such information indicating whether the system 100 permits or prohibits the automatic startup via a network, i.e., WOL (Wake-up ON LAN) is also written into RTC/CMOS 29.

I/O controller 30 is a peripheral controller for controlling operations of FDD 31, I/O operations of parallel data (PIO) via a parallel port 55, and I/O operations of serial data (SIO) via a serial port 56. A printer may be connected to the parallel port 55, whereas a modem may be connected to the serial port 56. A parallel signal line 30*a* not only extends to the parallel port 55 but also branches toward the docking connector 150. Further, a serial signal line 30*b* not only extends to the serial port 56 but also branches toward the docking connector 150. Similarly, a signal line 30*c* for the FDD 31 not only extends to an external FDD port 57 but also branches toward the docking connector 150.

The keyboard/mouse controller (KMC) 34 is a dedicated controller for capturing input scan codes from a keyboard 35, or input coordinate values from a TrackPoint 36 as computer data. Track Point 36 is a pointing device of a stick like shape, which is embedded near the center of the keyboard unit. A signal line 34*a* for the keyboard 35 and a signal line 34*b* for the mouse not only extend to an external keyboard port 53 and an external mouse port 54 but also branch toward the docking connector 150 respectively.

The audio CODEC 37 is a dedicated controller for performing input/output of audio signals, which comprises a CODEC circuit (COder-DECoder: namely AD, DA converters provided with mixing functions) for digitally recording/reproducing audio signals. The audio CODEC 37 is also capable of processing MIDI (Musical Instrument Digital Interface) data. A signal line 37*a* for MIDI is assigned to a portion of the docking connector 150. Further, a signal line 37*b* for audio output not only extends to a line output terminal 52 but also branches toward the docking connector 150.

An analog switch 61 is operated to connect/disconnect the end of ISA bus 18 to/from the docking connector 150. For example, when a secondary PCI bus (to be described below) is connected via the docking connector 150, the analog switch 61 disables an end of each bus signal, thereby to disconnect ISA bus 18 from the docking connector 150. On the other hand, when ISA bus 18 is extended via the docking connector 150, the analog switch 61 enables an end of each signal line, thereby to connect ISA bus 18 to the docking connector 150.

A DC inlet 71 is a jack for accepting an AC adapter that converts an external AC power source to a DC voltage. A DC/DC converter 70 drops/regulates the external DC voltage accepted via the DC inlet 71 and feeds its outputs to each component within the system 100. In case of accepting power from the expansion unit 200's side, it is fed to the DC/DC converter 70 via a power line 70*a*.

As shown, each bus signal of PCI bus 16/ISA bus 18, as well as other port signals 20*a*, 30*a*, 30*b*, . . . , and power line 70*a* are assigned to respective connector pins of the docking connector 150. Electrical and mechanical specifications of the docking connector 150 are matching with those of docking connector 250 provided at the expansion unit 200's side. By docking the system 100 with the expansion unit 200, each bus signal of PCI bus 16/ISA bus 18, as well as other port signals 20*a*, 30*a*, 30*b* on the computer 100's system unit may be expanded within the expansion unit 200.

Incidentally, the broken line Q–Q' in FIG. 1 is imaging the rear side of the notebook PC 100's system unit. The notebook PC 100 is connected to the expansion unit 200 at the docking connector 150 of its rear side. As a result of this connection at the rear side, respective ports 51, 52, 53, . . . provided at the rear side are concealed by the housing of the expansion unit 200 and they become unavailable for use. However, this does not raise any problems since each external device is available by means of the port replication function (aforementioned) of the expansion unit 200.

Incidentally, additional electronic circuits or the like other than those shown in FIG. 1 are required to construct the computer system 100. However, these components are not described in the present specification, since they are well known in the art and yet they do not pertain to the gist of this invention. Also, it should be noted that for brevity of the drawings, only a portion of the connections between the illustrated hardware blocks is shown in the drawings.

B. Hardware Configuration of Expansion Unit

Figure 2:
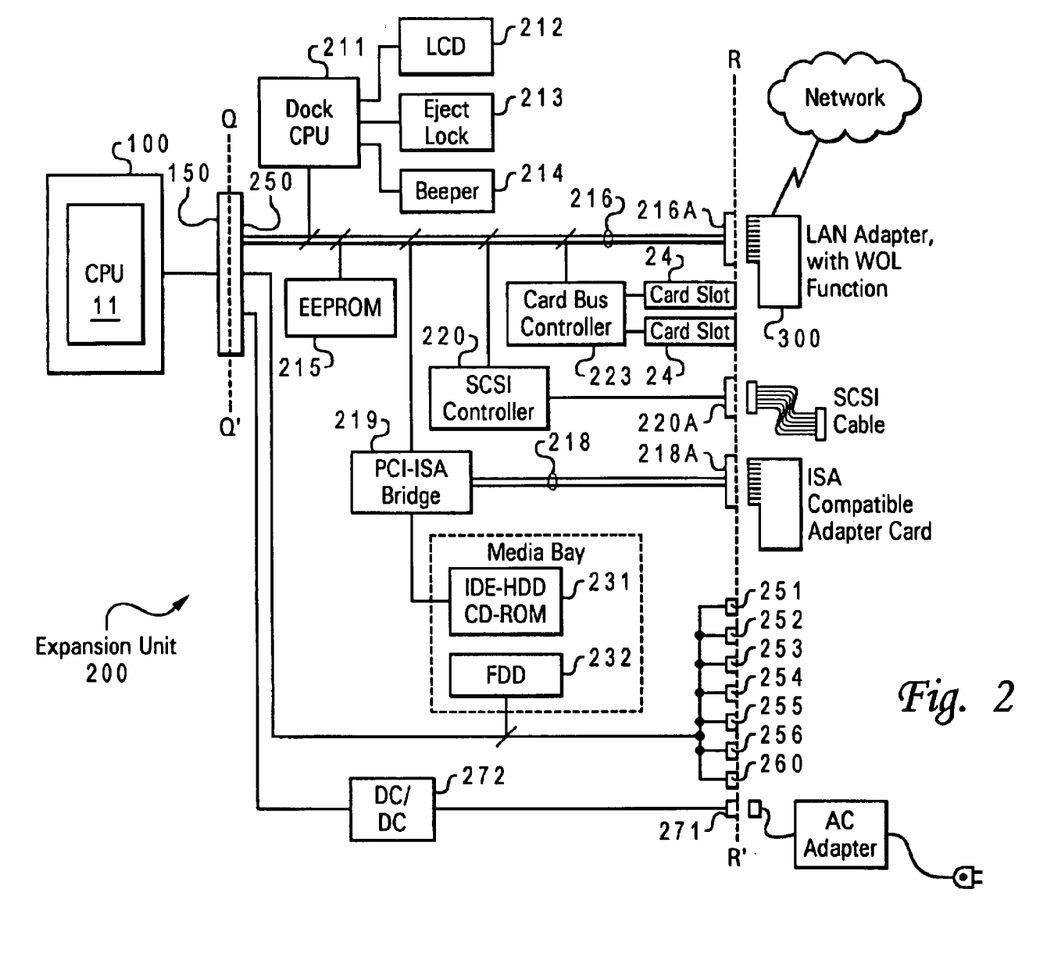
FIG. 2 is a diagram schematically showing a hardware configuration of an expansion unit that is provided for practicing this invention.

In FIG. 2, there is schematically shown a hardware configuration of the expansion unit 200 that is provided for practicing this invention. The expansion unit 200 is provided with a communication adapter such as a LAN adapter card or the like as a network subsystem, whereby a user of the notebook PC 100 is enabled to enjoy a network environment such as LAN or the like by simply docking the PC 100 with the expansion unit 200. It is assumed that the LAN adapter of the present embodiment has the WOL (Wake-up ON LAN) function.

The expansion unit 200 is provided with the docking connector 250, which has electrical and mechanical specifications compatible with those of the docking connector 150 provided at the computer 100's system unit, thereby to accept all of the bus signals and port signals via the connectors 150, 250.

CPU 211 at the expansion unit 200's side (DockCPU) is a main controller for coordinating operations of each component within the unit 200. DockCPU 211 contains a RAM (not shown) to be used as working areas and a ROM (not shown) for storing an executable program code (firmware). DockCPU 211 controls operations of various components, including but not limited to an LCD indicator 212 for displaying states of the unit 200, an eject lock 213 for mechanically prohibiting a removal of the computer 100's system unit and a beeper 214 for generating an operational alert sound.

From the computer 100's system unit (i.e., CPU 11), DockCPU 211 appears to be one of the peripheral devices connected to a bus, and it contains an I/O accessible I/O register. A portion of the I/O register is used as a WOL state register (to be described below). Incidentally, DockCPU 211 is fed power by the auxiliary power supply even when the computer 100 and the expansion unit 200 have been powered off.

EEPROM 215 is a rewritable, nonvolatile memory. EEPROM 215 is used for saving a small amount of data (such as a serial number of the expansion unit 200, a user's password, system configuration information and the like) for assuring security/system operations at the time of docking/undocking of the computer 100's system unit. The stored content of EEPROM 215 is referable to DockCPU 211 and/or the computer 100's system unit.

A DC/DC converter 272 is a device for dropping/regulating an external DC voltage inputted via a DC inlet 271 and for distributing power toward both of the expansion unit 200 and the computer 100's system unit. The DC inlet 271 is arranged to accept an AC adapter for converting an commercial AC voltage to a DC voltage. Note that the DC/DC converter 272 of the present embodiment includes the auxiliary power supply (to be described below) for continually feeding power to DockCPU 211 and a LAN adapter 300 even when the computer 100's system unit and the expansion unit 200 have been powered off.

All of the port signals and the like accepted via the docking connector 250 branch toward a CRT port 251, a line output terminal 252, an external keyboard port 253, an external mouse port 254, a parallel port 255, a serial port 256 and a MIDI port 260 respectively. Also, to an FDD signal line, an FDD 232 is connected.

To a secondary PCI bus 216 that is expanded at the expansion unit 200's side, those devices requiring relatively faster data transfers such as a SCSI (Small Computer System Interface) controller 220 and a card bus controller 223 are connected.

The SCSI controller 220 is a dedicated controller for performing a protocol conversion between PCI-SCSI, and a SCSI bus appears outside of the unit 200 at a SCSI port 220A. To the SCSI port 220A, SCSI external devices are connected by a SCSI cable in a daisy chain manner. Examples of the SCSI devices are an HDD, an MO drive, a DVD drive, a printer, a scanner and the like.

Similarly to the aforesaid hardware component 23, the card bus controller 223 is a dedicated controller for directly coupling PCI bus signals to a card slot 24.

Also, at the end of PCI bus 216, there are provided one or more PCI bus slots 216A. To one of the PCI bus slots 216A, a PCI compatible expansion adapter card may be mounted. In the present embodiment, at least the LAN adapter 300 with the WOL (Wake-up ON LAN) function is mounted on one of the bus slots 216A. The LAN adapter 300 is continually kept in its operable state by means of the auxiliary power source, thereby to assert a WOL signal in response to receipt of a wake-up packet via a network (to be fully described below).

Within the expansion unit 200, there is also provided a secondary ISA bus 218. The secondary ISA bus 218 is interconnected with the secondary PCI bus 216 by means of a bridge circuit (PCI-ISA bridge) 219. Provision of the secondary ISA bus 218 is intended to inherit the plentiful ISA legacies.

The bridge circuit 219 is configured in substantially the same manner as the aforesaid hardware component 18. The bridge circuit 219 includes an IDE interface for connecting an IDE device 231 such as an HDD and/or a CD-ROM drive. The IDE device 231 may be interchangeably accommodated in a "media bay" within the expansion unit 200 along with the FDD 232.

Further, at the end of the secondary ISA bus 218, there are provided one or more ISA bus slots 218A. To one of the ISA bus slots 218A, an ISA compatible expansion adapter card may be mounted.

While FIG. 2 shows a type of the expansion unit 200 that extends a PCI bus, the expansion unit 200 is not limited thereto. For example, it may be another type of an expansion unit that extends an ISA bus. In an extreme case, it may be a certain type of an expansion unit that extends only the LAN adapter card 300 with the WOL function.

C. Network Subsystem for Implementing WOL Function

Figure 3:
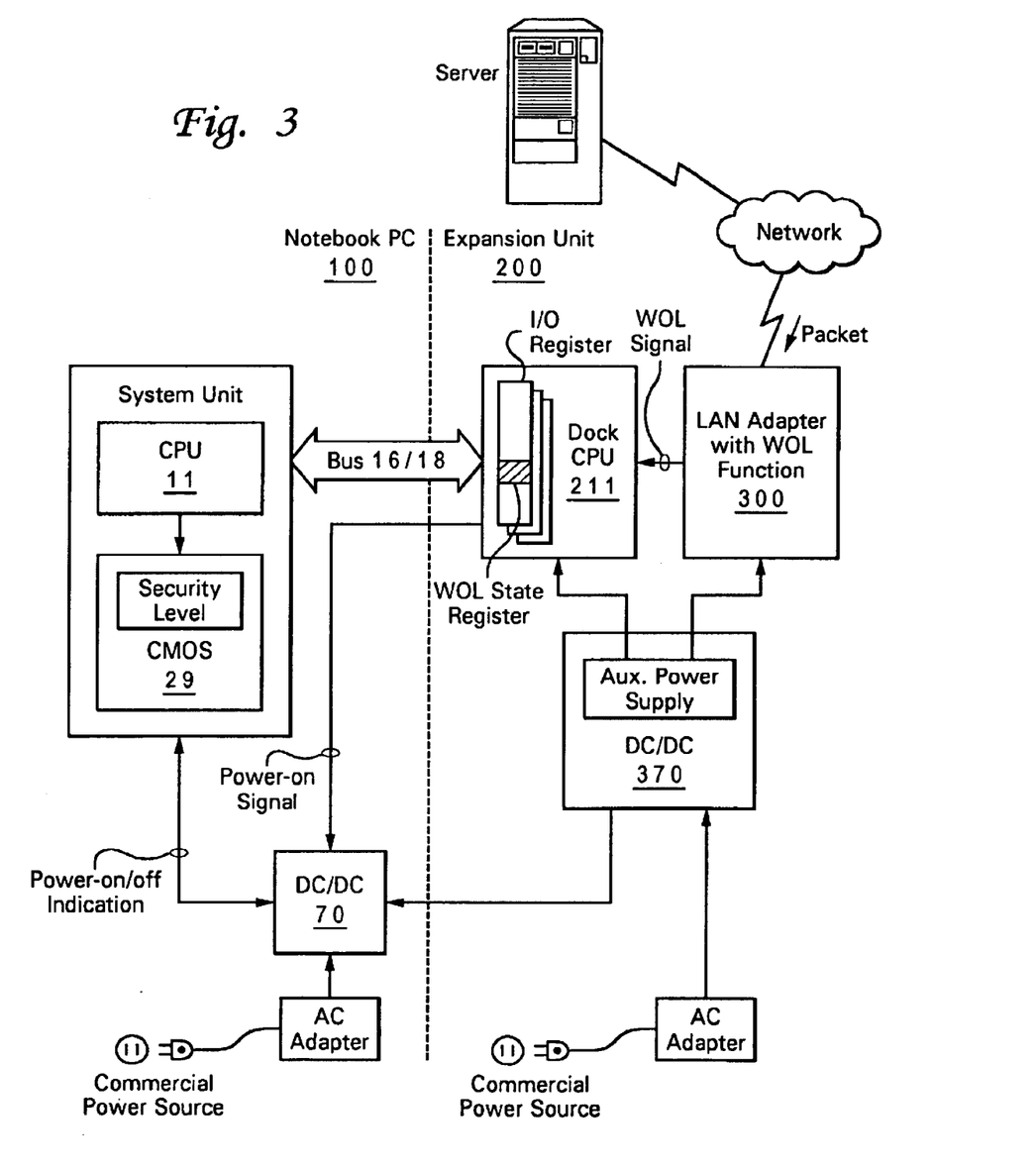
FIG. 3 is a system configuration diagram centering around the WOL function.

FIG. 3 is a system configuration diagram centering around the WOL (Wake-up ON LAN) function of a network subsystem. In order to implement security for the WOL function, at the expansion unit 200's side, cooperative actions of DockCPU 211 and the LAN adapter 300 are essential. DockCPU 211 and the LAN adapter 300 are continually fed power by an auxiliary power supply within a DC/DC converter 370 and, thus, they are kept in their operable states even when the computer 100's system unit and/or the expansion unit 200 have been powered off (aforementioned).

In the present embodiment, the LAN adapter 300 is provided to the expansion unit 200 in the form of a PCI compatible adapter card (aforementioned). The LAN adapter 300 has the WOL function and generates a WOL signal to DockCPU 211. When the LAN adapter 300 receives a packet frame or a wake-up packet representing a power-on indication via the network while the expansion unit 200 is being powered off, it responds thereto and asserts a WOL signal. Incidentally, the wake-up packet is generated on the network by a server machine, for example, which manages the entire network.

DockCPU 211 operates in accordance with the firmware that is stored in its internal ROM. From the computer 100's system unit, DockCPU 211 appears to be one of the peripheral devices, and it contains an I/O register that is I/O accessible via the bus 16 (or 18). A portion of the I/O register is allocated to a WOL state register. To the WOL state register, such information indicating whether the system 100 permits or prohibits automatic startup by WOL is written. CPU 11 on the computer 100's system unit is capable of permitting or prohibiting WOL by means of writing a predetermined value into this WOL state register.

DockCPU 211 operates in response to assertion of the WOL signal. If a value of the WOL state register indicates permission of WOL, DockCPU 211 asserts a power-on indication, i.e., a power-on signal to the computer 100's system unit. Conversely, if a value of the WOL state register indicates prohibition of WOL, DockCPU 211 ignores the WOL signal and does not assert a power-on signal to the computer 100's system unit. In other words, the WOL state register has a function for masking the WOL signal.

Also, on the computer 100's system unit, CPU 11 executes firmware stored in ROM 17, for example, to implement security for the WOL function. An example of this firmware is POST (Power On Self Test: self-diagnostic program) as an activation sequence that is executed by the system 100 at its power-on time.

As described above, the CMOS memory 29 not only stores critical information to security/safety of the system 100 in a nonvolatile manner but also such information of network security indicating that automatic startup by WOL is permitted or prohibited. By way of example, if a predetermined utility program is executed on the system 100 to set up "WOL permission", its related information is written into the CMOS memory 29. Conversely, if "WOL non-permission (prohibition)" is set up, its related information is written into the CMOS memory 29. This information of WOL permission/prohibition is saved and it is referred to at the time of executing the startup sequence, for example (to be described below).

The DC/DC converter 70 on the side of the computer 100's system unit may be fed power from either an AC adapter that is attached to the computer 100's system unit or the DC/DC converter 370 on the side of the expansion unit 200. In addition to starting/stopping power-on of the computer 100's system unit in response to manipulation of its power switch (not shown), the DC/DC converter 70 responds to assertion of a power-on signal from DockCPU 211 for starting power-on of the computer 100's system unit. Also, it shuts down the power supply for the computer 100's system unit in accordance with an instruction from CPU 11.

Incidentally, an implementation of a WOL sequence of this invention (to be described below) does not depend on network topology of a LAN. The LAN may be Ethernet, token ring or another network scheme.

D. WOL Sequence

Up to the previous section, we have described a hardware configuration adapted for implementing this invention. In this section, we will now describe a sequence of the WOL function in detail that is implemented by cooperative operations of the computer 100's system unit and the network subsystem on the side of the expansion unit 200.

Figure 4:
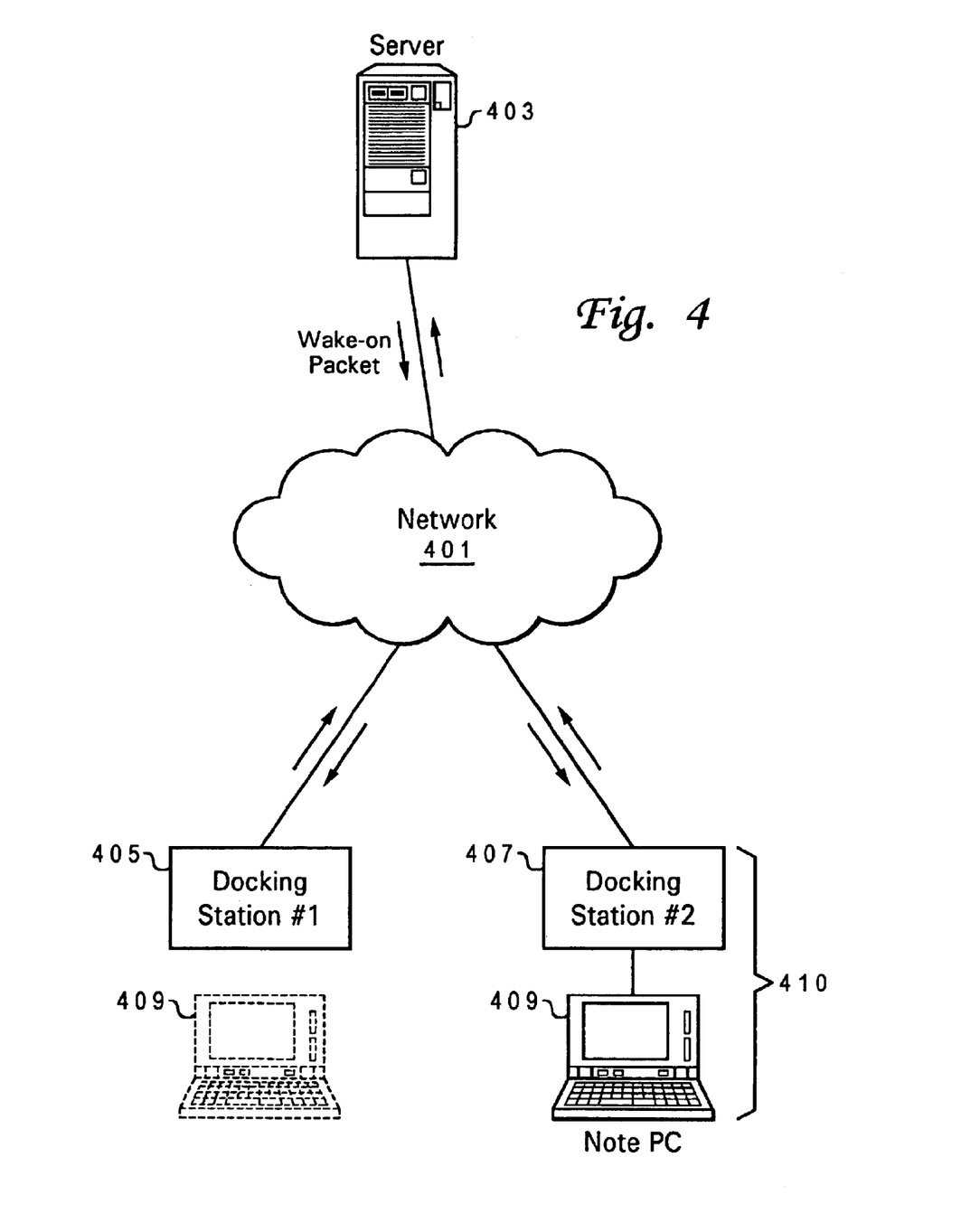
FIG. 4 is a diagram showing an entire network adapted for practicing this invention.

In FIG. 4, there is shown an entire network that includes one embodiment of this invention. A note type PC is not connected to a docking station (expansion unit) #1 (405), whereas a note type PC 409 is connected to a docking station (expansion unit) #2 (407). Each of the docking stations #1 (405) and #2 (407) is connected to a network 401 such as token ring type or the like via a communication adapter and a communication cable. To this network 401, a server 403 and the like are connected as well.

The server 403 is capable of sending a WOL packet to the docking station #1 (405) or #2 (407) that supports the WOL (Wake-up ON LAN) function, whereas the docking station #1 (405) or #2 (407) is capable of receiving the WOL packet sent from the server 403 and performing wake-up (i.e., power-on). The server 403 sends a WOL packet to a note type PC (alternatively called "note PC") during a convenient time zone such as midnight, where a user of the note PC is unlikely to use the same, for causing the note PC to be remotely powered on, thereby attempting to update all kinds of software stored in the note PC such as applications and/or BIOS.

Figure 5:
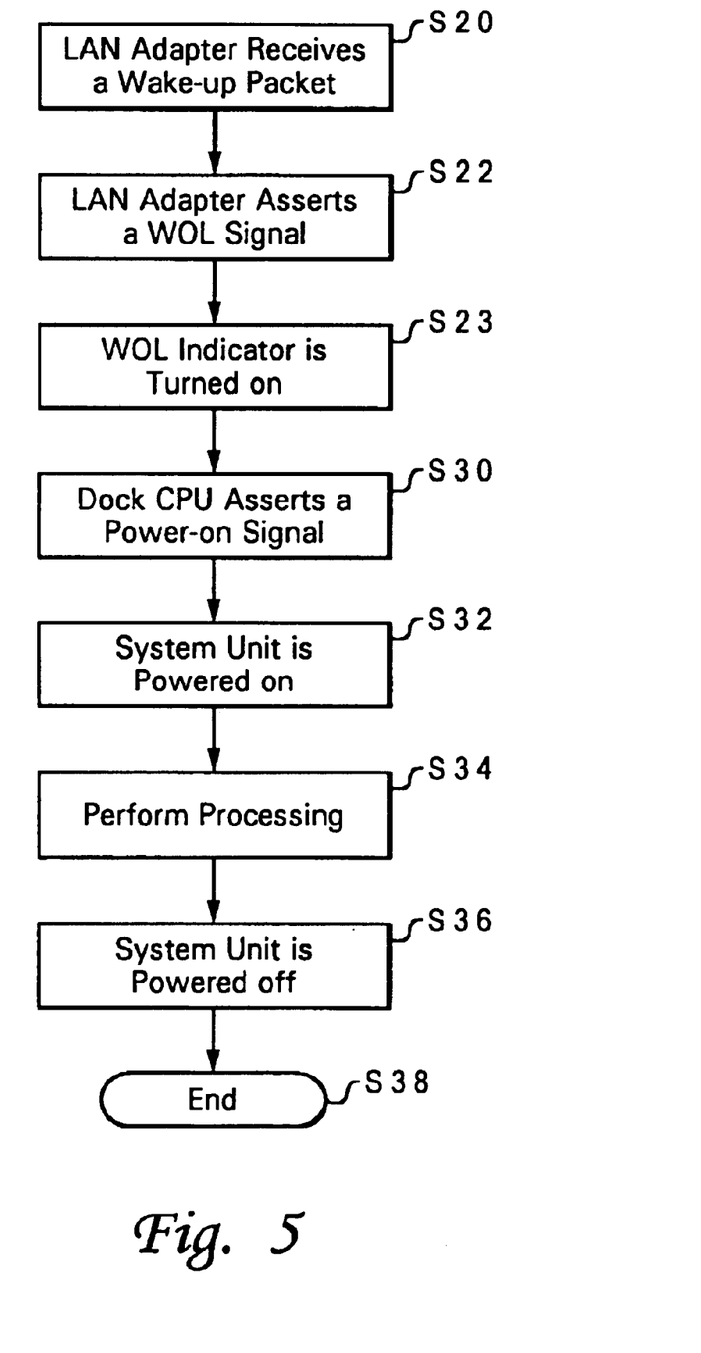
FIG. 5 is a flowchart illustrating a WOL sequence (first embodiment) that is cooperatively performed by a computer's system unit and expansion unit.

In FIG. 5, there are shown cooperative operations (first embodiment) in the form of a flowchart, which are performed by the computer 100's system unit (or 409) and the expansion unit 200 (or 407) upon receipt of a WOL packet. It is assumed, however, that the LAN adapter 300 and DockCPU 211 are kept in their operative states by means of the auxiliary power supply, whereas other components are powered off.

If the LAN adapter 300 receives a wake-up packet via the network (step S20), it asserts a WOL signal (step S22). The wake-up packet is generated on the network by a server machine, for example, which manages the entire network.

In response to the WOL signal, the WOL indicator is turned on to indicate that the WOL packet has been received by the docking station (step S23). By this operation, it becomes possible for a user of the PC system to directly recognize that the WOL packet has arrived.

Also, as a condition for turning on the WOL indicator, it is possible to use a logical AND operation of "WOL signal's generation" and "no computer being connected to the docking station". That is, in this case, the WOL indicator is turned on only if the docking station receives a WOL packet while no computer is connected to the docking station, whereas the WOL indicator is not turned on if the docking station receives a WOL packet while a computer is connected to the docking station.

DockCPU 211 asserts a power-on signal (step S30). On the side of the computer 100's system unit, in response to assertion of the power-on signal, POST program is executed in the same manner as the normal power-on time and, subsequent thereto, the computer 100's system unit enters into its operable state (step S32).

Then, processing requested from the server by means of WOL packets or the like is performed (step S34). For example, such processing may include updating of application programs, OS and/or BIOS stored in a nonvolatile memory and/or a hard disk apparatus within the computer 100.

After completing such processing requested from the server by means of WOL packets, the computer 100's system unit performs power-off processing (step S36) and, then, a sequence of processing is terminated (step S38).

In FIG. 6, there is shown a computer system 600, which comprises a docking station as an expansion unit of this invention combined with a system unit 630. Aside from the system unit 630, the docking station comprises a power supply circuit 620 including an auxiliary power supply 625 that is continually powered on as described with reference to FIG. 3, a WOL compatible LAN adapter 610, a WOL logic circuit 640, a WOL display circuit 650 and the like.

The auxiliary power supply 625 continually feeds power to the WOL compatible LAN adapter 610, WOL logic circuit 640, WOL display circuit 650 and the like even when the system unit 630 is being powered off. The WOL compatible LAN adapter 610 is connected to a network such as a LAN and if it receives a WOL packet sent from a server connected to the same network, it will responds to the WOL packet for generating a WOL signal 660.

Upon receipt of the WOL signal 660, the WOL logic circuit 640 outputs a power-on indication signal 690 to the power supply circuit 620, thereby causing the power supply circuit 620 to start power feeding to the system unit 630. Also, the WOL display circuit 650 responds to receipt of the WOL signal 660 for displaying the fact that the a WOL packet has been received in a manner recognizable to a user.

In FIG. 7, there is shown a docking station 710 as an expansion unit and a note type PC 720 as a computer connected to the docking station 710, which comprise one embodiment of this invention. This docking station 710 and the note type PC 720 are connected together via a connector 730.

In this drawing, there is shown a WOL display means 701, which is a portion of the WOL display circuit 650 shown in FIG. 6. The WOL display means 701 may be comprised of a light emitting element such as an LED (light emitting diode) or another element so long as it is recognizable to a user. Using a conventional LED that emits an orange or green color, a user is able to immediately know receipt of a WOL packet by noticing the LED that emits an orange or green colored light.

As an example, it is preferable to describe characters such as "Wake on LAN" 703, "Wake-up packet received" or an icon at a periphery of the WOL display means 701 so that a user can readily understand the situation at a glance, but it is not necessarily required to provide such character displays or the like. Also, in case of using a light emitting element such as an LED or the like as the WOL display means 701, it is possible to exploit a "method of continuously turning on LED" or a "method of flashing LED at a regular interval" as a manner for showing receipt of a WOL packet.

Further, while FIG. 7 shows the WOL display means 701 alone, it is possible to add a dock state indicator (not shown) along with the WOL display means 701, as described below with reference to FIG. 9. Moreover, it is possible to display information such as WOL and/or a dock state onto an LCD (liquid crystal display).

Figure 8:
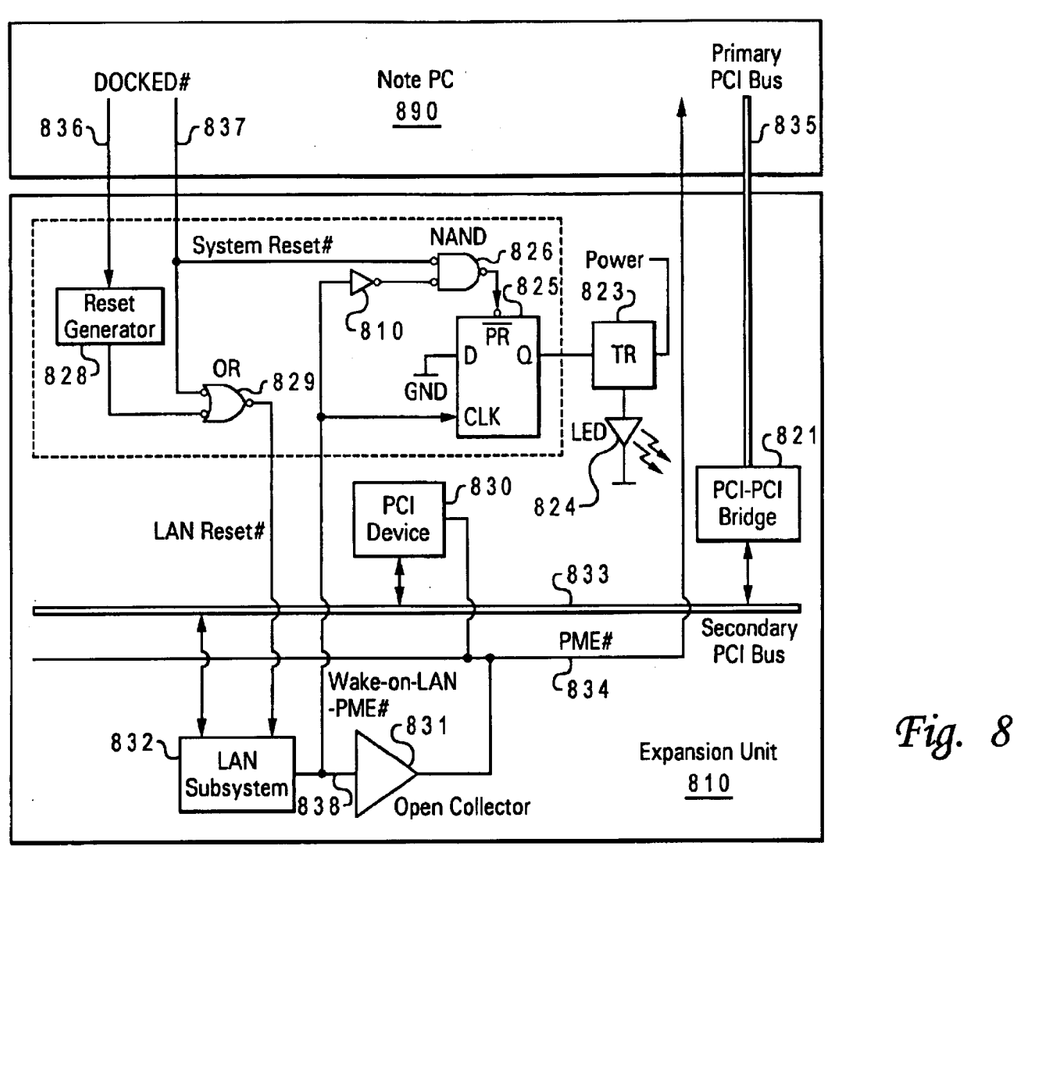
FIG. 8 is a circuitry diagram showing a WOL display circuit and its associated circuits within a computer system adapted for practicing this invention.

In FIG. 8, there is shown in detail the WOL display circuit 650 and its associated circuits in accordance with this invention. While an expansion unit (docking station) 810 and a note type PC 890 are normally connected by a certain bus, in the present embodiment, the note type PC 890 and the expansion unit 810 are connected by a PCI bus 835. The expansion unit 810 includes a PCI-PCI bridge circuit 821 for connecting the PCI (primary) bus 835, which connects the note type PC 890 and the expansion unit 810, to a PCI (secondary) bus 833 within the expansion unit 810.

To the PCI (secondary) bus 833, a LAN subsystem 832 as a PCI device is connected. The LAN subsystem 832 includes the LAN communication adapter 610. Upon receipt of a WOL packet from a server or the like via a network, the LAN subsystem 832 outputs a Wake-on-LAN-PME# signal that indicates receipt of the WOL packet. In order to conform to the specifications of a PCI bus, this Wake-on-LAN-PME# signal is outputted on the side of the note PC 890 via a drive circuit such as an open collector 831 or the like. In so doing, it becomes possible to distinguish a PME# signal derived by a WOL packet and a PME# signal derived by another factor other than a WOL packet from each other.

While the description herein is based on the PCI Management Specifications (Power Management Specifications), this invention may be based on another incompatible method other than PCI. In accordance with the PCI specifications, only one PME# signal for waking up the system exists in the same, and all of the functions connected to a PCI bus for enabling to wake up the system are defined to share this signal.

In such a case, a plurality of sources for activating this PME# signal may exist in the system and, thus, it is not possible to use this PME# signal as a condition for displaying a WOL state. Accordingly, it is necessary to separate a PME# signal 838 of the LAN subsystem 832 from a PME# signal 834 of the system.

Also, the Wake-on-LAN-PME# signal is sent to a clock (CLK) input terminal of a D-type flipflop (FF) 825 and an input terminal of an inverter 810 as well. When the D-type flipflop (FF) 825 receives the Wake-on-LAN-PME# signal, its output (Q) generates a LOW (0) output since its data input (D) terminal is grounded. A NAND circuit 826 performs a logical NAND operation of a System Reset# signal from the note PC 890 and an inverted signal of the Wake-on-LAN-PME# signal, thereby generating a HIGH (1) output and presetting the D-type FF 825 only if both input signals are HIGH (1).

The Q output of the D-type FF 825 is connected to a transistor 823, which is in turn connected to an LED 824. Thus, when the Qoutput is LOW (0), the LED 824 is turned on to display that the expansion unit 810 has received a WOL packet.

After receipt of a WOL packet, the LED 824 is in principle rendered to continually emit a light until it is reset by a next LAN Reset# signal. While this LAN Reset# signal is normally generated as a result of a logical OR operation of a System Reset# signal 837 from the note PC 890 and a DOCKED# signal indicating that the note PC 890 has been connected to the docking station 810, it is possible to generate this LAN Reset# signal in accordance with another alternative condition.

Using the circuitry configuration as shown in FIG. 8 in detail, when a WOL packet is received in such a situation where the docking station (expansion unit) 810 is not connected to the note PC 890 or the like, the LED 824 is caused to be turned on or flashed, thereby enabling to inform a user of receipt of the WOL packet.

Figure 9:
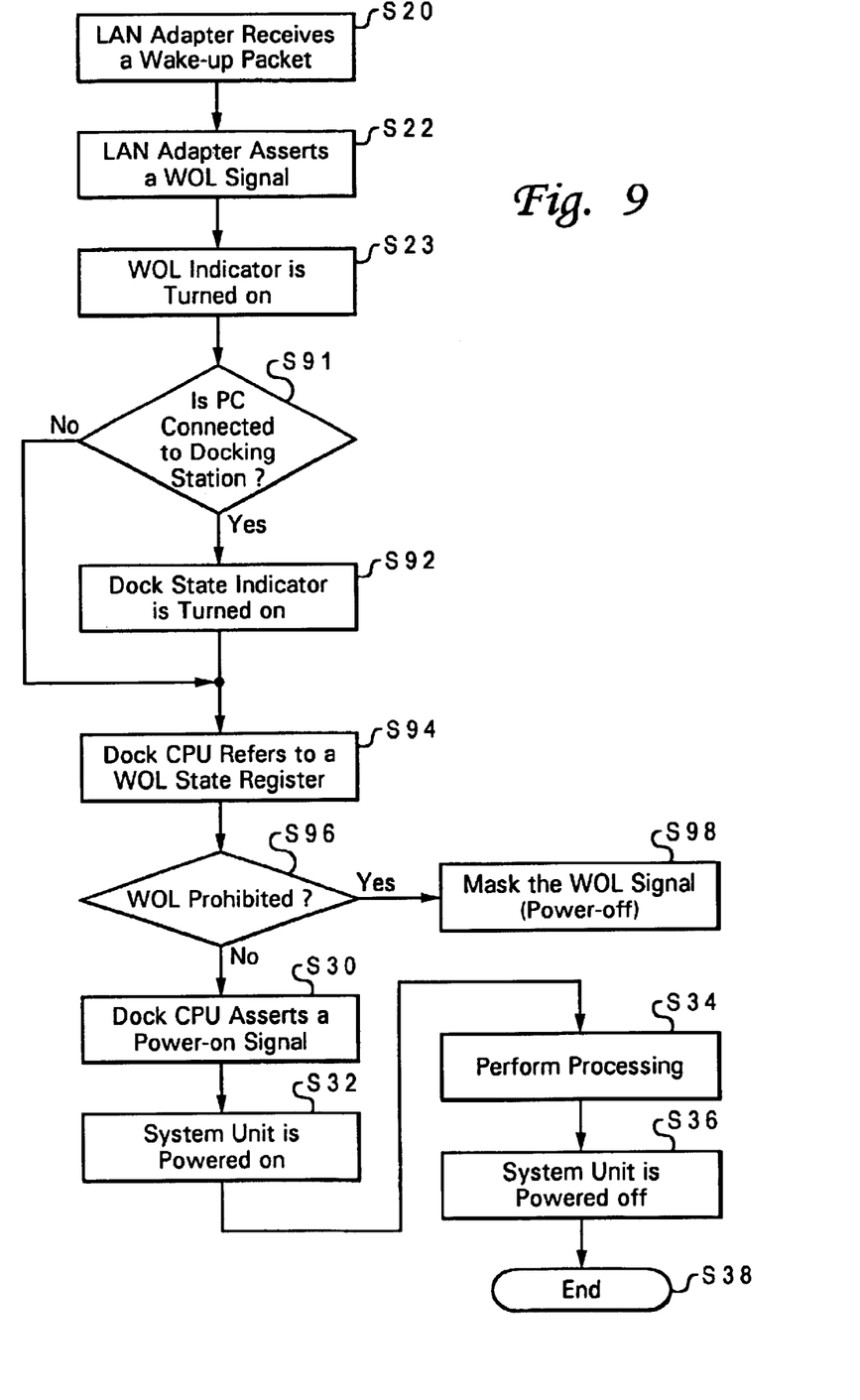
FIG. 9 is a flowchart illustrating a WOL sequence (second embodiment) that is cooperatively performed by a computer's system unit and expansion unit.

In FIG. 9, there are shown cooperative operations (second embodiment) in the form of a flowchart, which are performed by the computer 100's system unit (or 409) and the expansion unit 200 (or 407) upon receipt of a WOL packet. It is assumed, however, that the LAN adapter 300 and DockCPU 211 are kept in their operative states by means of the auxiliary power supply, whereas other components are powered off.

Of the steps shown in FIG. 9, steps S20, S22, S30, S32, S34 and S36 are not explained below since they are identical to those shown in FIG. 5.

At step S23, in response to the WOL signal, the WOL indicator is turned on to indicate that the WOL packet has been received by the docking station (step S23). By this operation, it becomes possible for a user of the PC system to directly recognize that the WOL packet has arrived.

At step S91, it is determined whether or not the computer (PC) 100 has been connected to the docking station 200. If the computer has been connected, the process proceeds to step S92. Otherwise, the process branches to step S94.

At step S92, a dock state indicator is turned on to display the connected state of the PC 100 and the docking station 200. In response to assertion of the WOL signal, DockCPU 211 refers to its own WOL state register, if any (step S94) to determine whether or not WOL is permitted (step S96). However, it is not an essential requirement of this invention that the expansion unit has a WOL state register. Thus, in a case where the expansion unit does not have a WOL state register, steps S94 and S96 may be skipped.

If a predetermined value representing "WOL prohibition" is already set up in the WOL state register, the process proceeds to step S98, where DockCPU 211 masks the WOL signal. In this case, a power-on indication is not issued to the computer 100's system unit and, thus, the computer 100's system unit is kept in its power-off state. As a result, the server on the network that originated the wake-up packet is not capable of accessing the computer 100 nor is it enabled to manage the computer 100's system configuration. In this case, a record of inaccessibility may be kept on the server.

Conversely, if a predetermined value representing "WOL permission" is continually held in the WOL state 15' register, or if the expansion unit 200 does not have a WOL state register, DockCPU 211 asserts a power-on signal (step S30). Even if the computer 100's system unit has already prohibited WOL (i.e., information of "WOL prohibition" is written into the CMOS memory 29), the WOL state register may still exhibit "WOL permission" at certain occasions, such as immediately after the computer 100 is connected to the expansion unit 200 or the WOL state register is initialized, without precisely reflecting the intention of the computer 100's system unit.

The computer 100's system unit responds to assertion of the power-on signal for executing POST program in the same manner as the normal power-on time. Subsequent thereto, it enters into its operable state (step S32), performs a sequence of operations of steps S34, S36, and its operation is terminated (step S38).

In the above, this invention has been described in detail with reference to a specific embodiment. However, it is apparent that various changes or substitutions in this embodiment may be made by those skilled in the art without departing from the gist of this invention.

While the present embodiment has been described on the basis of the so-called PC/AT compatible machines ("PC/AT" is a trademark of IBM Corp.) conforming to the OADG specifications, it is apparent that this invention may be implemented in other machines as well (e.g., the PC 98 series of NEC Corp., Macintosh of Apple Computer, Inc. and compatible machines thereof).

In summary, this invention has been disclosed in an exemplary manner and, thus, this invention is not to be limited except as proscribed by the claims. As described above, in accordance with this invention, it is possible to provide an improved expansion unit, which offers a function for displaying receipt of a WOL (Make-up ON LAN) packet to an information processing system mounted on the expansion unit.

What is claimed is:

1. A connection unit for use with a computer connectable to a network, said connection unit comprising:

means, responsive to receipt of a predetermined wake-up packet via said network, for generating a predetermined signal; and means responsive to said predetermined signal, for persistently displaying the receipt of said predetermined wake-up packet utilizing a dedicated display, wherein said dedicated display is only utilized to indicate receipt of said predetermined wake-up packet.

2. The connection unit as recited in claim 1, wherein said computer is not connected to said connection unit.

3. The connection unit as recited in claim 2 further comprises means, responsive to the receipt of said predetermined wake-up packet, for displaying the non-connection of said computer.

4. The connection unit as recited in claim 1 or 2, wherein said predetermined wake-up packet included an instruction for causing a power supply of said computer to be remotely turned on.

5. The connection unit as recited in claim 1 or 2, wherein said network is a local area network (LAN).

6. The connection unit as recited in claim 1 or 2, wherein said displaying means comprises a liquid crystal display (LCD).

7. The connection unit as recited in claim 1 or 2 further comprising means for resetting said means for persistently displaying the receipt of said predetermined wake-up packet.

8. A network system comprising:

a network; and a terminal apparatus connectable to said network, said terminal apparatus including:

means, responsive to receipt of a predetermined wake-up packet via said network, for generating a predetermined signal; and dedicated display means, responsive to said predetermined signal, for persistently displaying the receipt of said predetermined wake-up packet wherein said dedicated display means is only utilized to indicate receipt of said predetermined wake-up packet.

9. The network system as recited in claim 8, wherein said terminal apparatus is a portable equipment.

* * * * *